F. W. GEOGHEGAN.
TROLLEY CATCHER.
APPLICATION FILED JUNE 27, 1910.
1,002,983.
Patented Sept. 12, 1911.
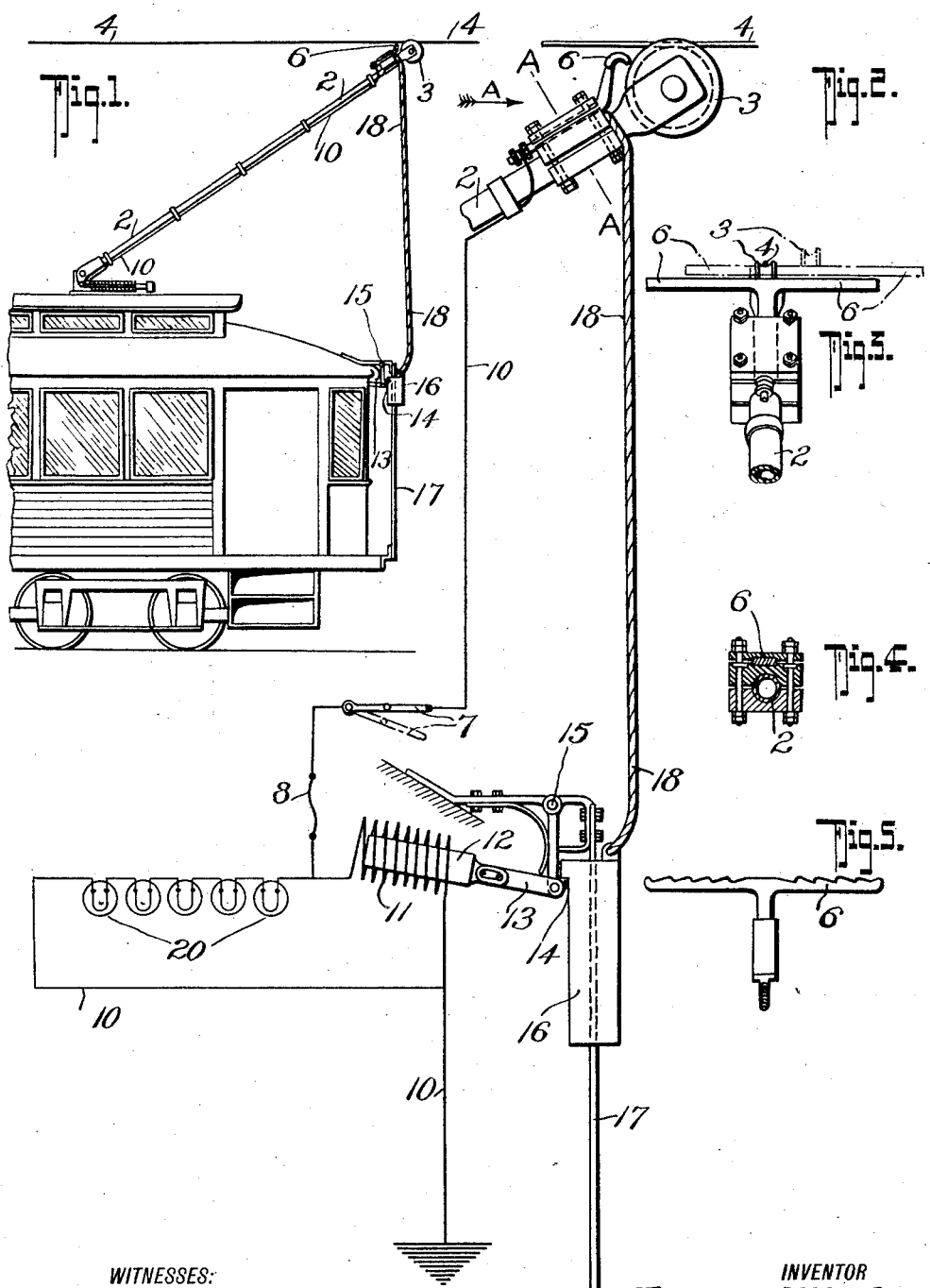
WITNESSES:
Charles H. Wagner
John T. Schrott
INVENTOR
Frederick W Geoghegan
BY
Fred G Dieterich
ATTORNEYS

UNITED STATES PATENT OFFICE.

FREDERICK W. GEOGHEGAN, OF VANCOUVER, BRITISH COLUMBIA, CANADA.

TROLLEY-CATCHER.

1,002,983.   Specification of Letters Patent.   Patented Sept. 12, 1911.

Application filed June 27, 1910. Serial No. 569,070.

*To all whom it may concern:*

Be it known that I, FREDERICK W. GEOGHEGAN, a subject of the King of Great Britain, residing at Vancouver, in the Province of British Columbia, Canada, have invented a new and useful Trolley-Catcher, of which the following is a specification.

This invention relates to a device designed to avoid the injury done to the suspension wires which support the trolley wire of an electric railway, by providing a means that when the trolley wheel runs off the overhead wire through which the current is derived will shunt a portion of that current into a circuit where it will operate a mechanism by which the trolley arm is immediately drawn down clear of the trolley wire and its supports and guys.

The invention is particularly described in the following specification, reference being made to the drawings by which it is accompanied, in which:

Figure 1 is a side elevation of the end of a car showing the application of the device to the trolley pole, Fig. 2 shows to an enlarged scale the operative mechanical parts, the electric earth circuit being shown diagrammatically in connection therewith, Fig. 3 is an end elevation of the trolley head looking in the direction of the arrow A, and Fig. 4 is a cross section on the line A A in Fig. 2. Fig. 5 shows an alternative form of the cross bar.

In these drawings 2 represents the trolley pole and 3 its wheel or sheave, 4 being the overhead wire with which the trolley wheel is normally in contact. Secured to the trolley pole 2 adjacent to its head and electrically insulated therefrom is a metal cross bar 6 extending laterally on each side from the pole. The upper surface of this bar is sufficiently below the level of the upper side of the trolley wheel which is in contact with the trolley wire, to avoid contact with the trolley wire supports while the trolley wheel is on the wire. The cross bar 6 is here shown as secured to a block of hard wood or similar insulating material which is itself clamped to the pole but may be secured in any other manner that may be found convenient and satisfactory.

The cross bar 6 is electrically connected to the frame of the car and thereby to earth by a circuit 10, so that if at any time the trolley wheel runs off its wire 4 the cross bar 6 will contact with the wire, as shown by dot and dash lines in Fig. 3, and a current will pass through the circuit 10 to earth. In this circuit 10 is a solenoid 11 the core 12 of which is loosely connected by a link 13 to the free end of a latch 14 pivotally mounted at 15 on an attachment to the frame or roof of the car. This latch 14 engages a projection on, and thereby sustains, a weight 16 which is vertically slidable on a rod 17 secured outside the after end of the car, and to this weight 16 is connected the trolley cord 18 from the head of the trolley pole 2.

The connection of the core 12 of the solenoid to the latch 14 should be by a means that will permit of endwise movement of the core before the pull comes upon the latch as by this means the momentum of the core is available in effecting the release of the latch and a smaller solenoid may be used; and to insure that this endwise slack is available when required the axis of the solenoid is placed at an angle from the horizontal so that the vibration of the car will shake the core 12 outward toward the latch.

A lamp circuit 20 may be placed in parallel with the solenoid 11 and the illumination of these lamps will serve to indicate to the conductor when the trolley has left the overhead wire.

A simple and effective device is thus provided that will be automatically called into operation whenever occasion arises for its use. As soon as the trolley wheel leaves the overhead wire the cross bar 6 will come into contact with the wire and by such engagement will not only prevent the immediate elevation of the head of the trolley pole above the level of the trolley wire and among the trolley wire supports and guys but as soon as it contacts with the wire a current will pass through the circuit 10 and will energize the solenoid which will release the latch 14 from engagement with the weight when the weight will fall and by the cord connection 18 will draw down the trolley head.

The contour of the upper side of the cross bar 6 may be provided with depressions that will tend to prevent it from slipping off the wire.

The cross arm 6 is not only instrumental in drawing down the trolley head but it will also assist the conductor in restoring the trolley sheave to the wire, to facilitate which the circuit 10 is provided with a switch 7 in a convenient position for the conductor's use; a safety fuse 8 may also be placed in the circuit 10.

Having now particularly described my invention and the manner of its operation, I hereby declare that what I claim as new and desire to be protected in by Letters Patent, is.

1. The combination with a trolley pole of an electric car, of a cross arm carried by said pole and electrically insulated from the same, a bracket mounted on the car, a vertically held rod supported by said bracket, a weight slidable on said rod, a connecting cable between said weight and the trolley pole, said weight having a projection, a latch pivotally supported by said bracket to engage said weight projection, a spring carried by said bracket to hold said latch in engagement with said weight, a solenoidal magnet having its core attached to said latch, an electric connection between said magnet and said cross arm and another electric connection between said magnet and the ground return of the trolley circuit.

2. The combination with a trolley pole of an electric car, of a cross arm carried by said pole and electrically insulated from the same, a bracket mounted on the car, a vertically held rod supported by said bracket, a weight slidable on said rod, said weight having a projection, a latch pivotally supported by said bracket to engage said weight projection, a spring supported by said bracket to hold said latch in engagement with said weight, a solenoidal magnet having its core attached to said latch, an electric connection between said magnet and said cross arm and another electric connection between said magnet and the ground return of the trolley circuit, said bracket being bent to form a stop for engagement by said latch to limit its movement under the influence of said spring.

In testimony whereof I have signed my name to this specification in the presence of two subscribing witnesses.

FREDERICK W. GEOGHEGAN.

Witnesses:
ROWLAND BRITTAIN,
ALEXANDER SMITH.

---

Copies of this patent may be obtained for five cents each, by addressing the "Commissioner of Patents, Washington, D. C."